United States Patent [19]

Yamamoto

[11] 3,785,274
[45] Jan. 15, 1974

[54] REVERSIBLE COOKING INSTRUMENT

[76] Inventor: Yuki Yamamoto, 1343 Ushita-machi, Hiroshima, Japan

[22] Filed: Oct. 20, 1971

[21] Appl. No.: 190,991

[52] U.S. Cl. .................................. 99/425, 126/390
[51] Int. Cl. ........................................... A47j 37/10
[58] Field of Search..................... 99/425, 339, 340, 99/422–423, 424, 432, 444–445, 446–447, 450; 126/390; 220/9–10

[56] References Cited
UNITED STATES PATENTS

| | | | |
|---|---|---|---|
| 1,733,450 | 10/1929 | Detweiler | 126/390 X |
| 2,198,647 | 4/1940 | Wolcott | 99/340 |
| 2,742,850 | 4/1956 | La Fond | 99/425 X |
| 2,774,295 | 12/1956 | Watkins | 99/425 |
| 3,509,813 | 5/1970 | Appelt | 99/432 |

Primary Examiner—Peter Feldman
Assistant Examiner—Arthur O. Henderson
Attorney—Lerner, David, Littenberg & Samuel

[57] ABSTRACT

A reversible cooking instrument comprising mainly a vessel and a brim of which edge having a downward projection, and said instrument, when reversed, comprising a crown-like body corresponding to said vessel and a brim of which edge having an upward projection, wherein a head of said body having a central plane portion surrounded with an outer sloping portion extending to and connecting with a peripheral wall of said body, said peripheral wall further connecting with said brim of which edge being projected upwards to form a circular groove in combination with said peripheral wall.

2 Claims, 6 Drawing Figures

REVERSIBLE COOKING INSTRUMENT

BACKGROUND OF THE INVENTION

The present invention relates to generally to a cooking instrument, and more particularly a cooking pan which is reversible and is smokeless.

There have been used for cooking a number of pans which are different in kind and in type, among which are typically known a stew pan and a frying pan. However, scarecly any pan is available for plural purposes, and thus it would be very convenient if there were such pan. At the same time, the kitchen work would be done much pleasantly, and in more sanitary environment if giving-off of smoking and flying-about of oily or greasy materials are kept off, when cooking and using the pan.

SUMMARY OF THE INVENTION

A principal object of this invention is to provide a novel and useful cooking instrument which is reversible and which is adapted to be available for plural purposes wherein one side thereof is capable of evaporating and or boiling as in a stew pan, while the reverse side thereof is configured so as to be capable of cooking, particularly broiling meat or the like efficiently and palatably.

Another object of the present invention is to provide a novel and useful cooking instrument whereby cooking, particularly broiling may be achieved in its reversed position without giving-off smoke and flying-about or scattering oily or greasy materials applied to the surface thereof.

A reversible cooking instrument according to one aspect of the present invention, when reversed, comprises a crown-like body for placing thereon foods to be cooked particularly broiled, having a head of which central plane portion being surrounded with an outer sloping portion for flowing the over-supplied oily or greasy materials, said outer sloping portion extending to and connecting with a peripheral wall of the crown-like body, said peripheral wall further connecting with a brim of which edge projecting upwards so as to form in combination with said peripheral wall a circular groove for supplying therein water or moist materials to give proper moistness arisen therefrom to the foods to be cooked and thereby giving-off of smoke and flying-about of oily or greasy materials are prevented.

In another aspect of the invention, a reversible cooking instrument, when reversed, may comprise a crown-like body and a brim as characterized in the foregoing paragraph, said crown-like body, however, having a head of which central plane portion being thickened than an outer sloping portion for giving thereto a larger thermal capacity, said crown-like body further having a stepped prtion interconnecting the outer sloping portion and a peripheral wall of said head for keeping the foods to be cooked from falling out of said head.

The principle, nature, and utility of the present invention will be better understood from the following detailed description of the invention when read in conjunction with the accompanying drawings.

DETAILED DESCRIPTION OF THE INVENTION

Figure 1:
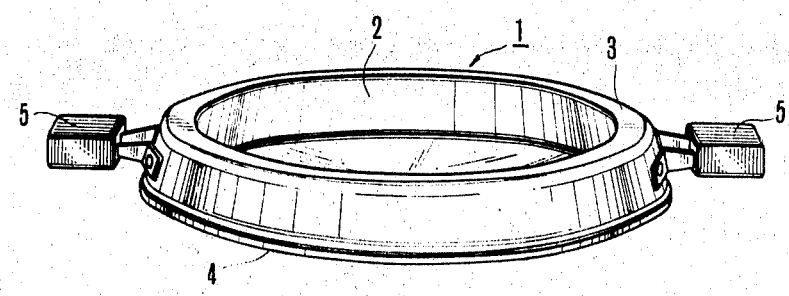
FIG. 1 is a perspective view showing a reversible cooking instrument in its normal position according to the present invention.
Figure 2:
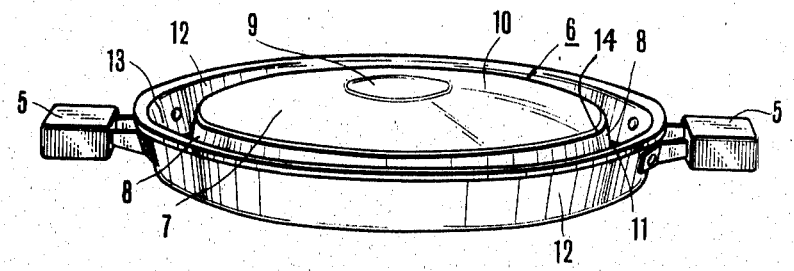
FIG. 2 is a perspective view showing a reversible cooking instrument in its reversed position according to the present invention.
Figure 3:
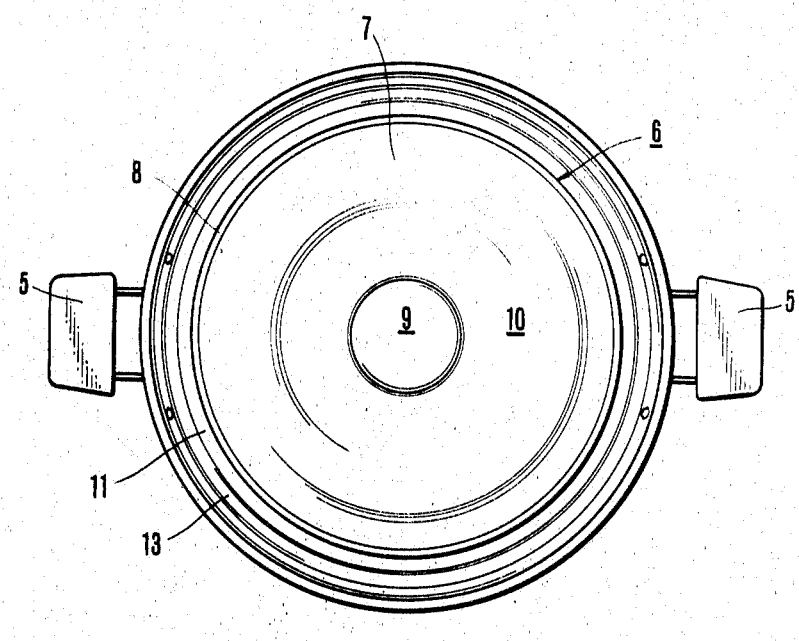
FIG. 3 is a plan view of said instrument as shown in FIG. 2.
Figure 4:
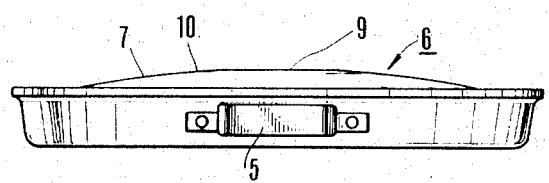
FIG. 4 is a side view of said instrument as shown in FIG. 2.

Referring now to the drawings, a vessel 1 is in a form of a shallow pan and is employed for evaporating and boiling foods as in a stew pan.

A peripheral wall 2 of the vessel 1 projects upwards and rather obliquely, then turns outwards and forms a horizontal brim 3, and further turns downwards and rather obliquely so as to provide a circular clearance 4 around the periphery of the vessel 1.

The surface as well as the reverse side of vessel 1 and brim 2 are respectively made from aluminium cast metal and are processed by the grinding finish so that both sides are applicable for cooking.

When cooking, the electric heat produced by an electric range or the thermal gas released from a gas burner or a gas ring of a gas range flows radiately along the bottom of vessel 1 toward circular clearance 4. Such flow is at a time kept stagnant within the circular clearance 4 and then goes out. The circular clearance prevents therefore the waste of electric heat or thermal gas and it will be available at the same time for promoting the thermal effeciency. In addition thereto, a supply of electric heat or thermal gas heats not only the bottom but also all over the vessel, and such even heating will bring satisfactory cooking results. Meanwhile, the numeral 5 in the drawing shows a pair of handles.

The principal feature of the present invention is presented when the subject matter of the invention is applicated for cooking in its reversed position, wherein 6 is a crown-like body which corresponds to the vessel 1 in the normal position of the invention. Crown-like body 6 consists of a head 7 and a peripheral wall 8. Head 7 has a central portion 9 which is plane and an outer portion 10 which surrounds said central portion and slopes down outwards to connect with the upper end of the peripheral wall 8. The peripheral wall turns down obliquely from the outer end of said outer portion to form the crown-like body and connects with a horizontal brim 11. The horizontal brim further connects with an outer peripheral wall 12 which projects upwards and more or less outwards. Peripheral wall 8, horizontal brim 11 and outer peripheral wall 12 thus form a circular groove 13 around the crown-like body.

This cooking instrument mainly comprising the crown-like body and the circular groove surrounding therearound is made from aluminium cast metal or the like.

In cooking, particularly broiling meat, fowl, fishes or the like, the instrument is put over the head produced by the electric range or over the fire of a gas burner or a gas ring of a gas range. Water or vegetables containing considerable amount of moistness is or are then supplied into the circular groove 13, while meat or fishes are placed on the head 7 to which surface oily or greasy materials are beforehand applied. Once water and these materials supplied for cooking are heated, the moistness in the circular groove 13 is by such heating evaporated, thereby the surface of the head 7 is always during cooking kept at the desired temperature without being over-heated.

Meat or the like on the head 7 are therefore neither carbonized themselves nor carbonized together with the oily or greasy materials, and thus giving-off of smoke out of the instrument is prevented.

In the case that the conventional frying pan or a frying pan of which central portion is formed so as to slightly slant upwards is used for broiling meat or the like, the fat oozing from meat or the like and soy sauce or mixtures thereof with various seasonings applied to cooking are liable to spread toward the peripheral of the pan. Materials to be broiled located adjacent to or in the neighborhood of the periphery of the pan are therefore broiled as they are steeped in the oily or greasy materials with soy sauce or mixtures thereof with various seasonings and are escaped from scorching. Materials located at the central portion are however taken out their fat and moistness and their original flavors are lost.

According to the present invention, the outer portion 10 surrounding the central portion 9 which is plane is formed so as to slope downwards and connects with the circular groove 13 at the upper end of the peripheral wall 8 thereof.

Said central portion 9 and said outer portion 10 constitute the head 7 which corresponds to the bottom of the conventional frying pan. In such head configured as above, the central portion 9 is always filled with the oily or greasy materials or these materials combined with soy sauce or the like which being supplied thereon, if, however, the oily and other materials are over-supplied or too much fat are oozed from the foods under cooking, such materials and fat are permitted to flow into the circular groove 13 through sloping surface of the outer portion 10. Therefore, the foods placed on the central portion are well broiled as they are steeped in the oily materials, fat, soy sauce or the like or in any combination thereof, as well as those placed on the outer portion, and foods thus broiled would be no doubt toothsome. In this matter of broiling, it is preferable that the heating for the instrument will be adjusted so as to maintain the temperature of the surface of the head 7 will not exceed the level of 190°C. It has been revealed in the experiment that as the temperature exceeds such level, materials under cooking as well as oily or greasy materials or the materials combined with soy sauce or the like are beginning to scorch and the smoke starts to give off. It is also advisable to watch and avoid the drying up of water in the circular groove 13, and to pour therein water sufficient enough to prevent such drying-up.

Figure 5:
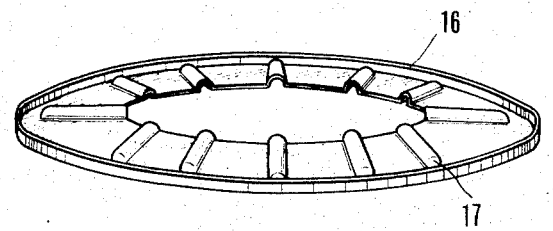
FIG. 5 is a perspective view of a supplemental ringed plate.
Figure 6:
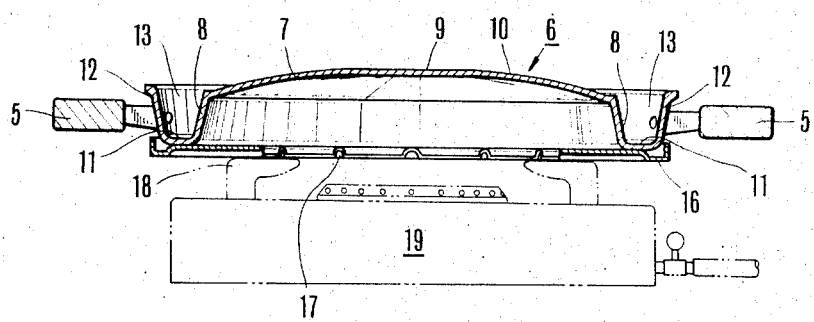
FIG. 6 is a cross sectional view showing the reversible cooking instrument in combination with said ringed plate which are rested on a portable gas range.

For heating, the instrument may be put directly over a ring of an electric range or a gas range. It is desirable, however, that the instrument be rested on the ring by an intermediation of a supplemental ringed plate 16 as shown in FIG. 5. Supplemental ringed plate 16 is formed so as to receive the instrument by the horizontal brim 11 and is adapted to support same, for example, on a gas ring 18 of a gas range 19. Further, supplemental ringed plate 16 is provided with a plurality of air flowing channels 17, which are disposed radiately in the ring portion thereof, and which is available for heating by thermal gas. Thermal gas is after heating discharged out of the gas ring 18 by means of and through the air flowing channels 17, thereby complete combustion of thermal gas is achieved.

In another aspect of the present invention, the reversible cooking instrument comprises the crown-like body 6 and the horizontal brim 11 and the outer peripheral wall 12, said crown-like body having the head 7 and the peripheral wall 8, said head further having the central portion 9 with a plane surface and the outer portion 10 with a sloping surface surrounding said central portion and connecting with the upper end of said peripheral wall, wherein the central portion 9 is given thickening in such a manner that the cross section thereof forme like a convex mirror.

As aforementioned, the surface of the head 7 is given moistness contained in the evaporation which has arisen out of water supplied in the circular groove 13 as it has been heated by electric range or gas range or the like, and thus the surface is always during cooking kept at the desired temperature for broiling without being overheated. However, the surface of the head 7, especially the central portion 9, is as will be readily understood, not so much subject to the influence of the control of temperature by the above-mentioned moistness contained in the evaporation.

According to the present embodiment of the invention, since the central portion 9 is given thickening, the thermal capacity provided in said thickening may be much larger than the other portions forming the head 7. For this reason, when the instrument is heated, variations to an elevated level of the temperature at the central portion proceeds gradually, and in case that it was heavily heated, such heat would be dispersed around and prevent an over-heating.

In further aspect of the present invention, the reversible cooking instrument may comprise the instrument as characterized in the foregoing embodiments wherein a circumferential flat stepped portion 14 is provided between and interconnecting an outer end of the outer portion 10 and an upper end of the peripheral wall 8. The stepped portion thus provided prevents and will not permit the materials such as meat, fishes or the like which are under broiling or which has been broiled to fall out of the head 7 and into the circular groove 13.

According to the present invention and in any of the embodiments as set forth above, the head of the instrument is given such configuration that may avoid it being over-heated, thereby the giving-off of smoke and flying-about of the oily or greasy materials or the materials combined with soy sauce or the like are prevented. The head will not be therefore given damages by scorching of the materials to be broiled which are sometimes stuck to the surface of the head, and it will help the instrument to be durable in use for a long time.

What is claimed is:

1. A reversible cooking instrument comprising a vessel and a brim thereof, and said instrument when reversed, comprising a crown-like body corresponding to said vessel and a brim thereof, wherein a head of said body has a central plane portion surrounded with an outer sloping portion extending to and connecting with a peripheral wall of said body, said crown-like body including a circumferential flat stepped portion which interconnects said outer sloping portion of said head and an upper end of said peripheral wall, said peripheral wall further connecting with said brim, the edge of said brim projecting upwards to form a circular groove in combination with said peripheral wall.

2. A reversible cooking instrument as defined in claim 1 said central plane portion being thicker than said outer sloping portion.

* * * * *